United States Patent
Baruch et al.

(10) Patent No.: US 11,074,364 B2
(45) Date of Patent: Jul. 27, 2021

(54) CONFIDENTIAL DATA SECURITY

(71) Applicant: Microsoft Technology Licensing, LLC, Redmond, WA (US)

(72) Inventors: Keren Kochava Baruch, San Francisco, CA (US); Ahsan Latif Chudhary, Milpitas, CA (US); Funing Xu, Zhengzhou (CN); Shi Yan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 16/228,476

(22) Filed: Dec. 20, 2018

(65) Prior Publication Data
US 2020/0202036 A1    Jun. 25, 2020

(51) Int. Cl.
| | |
|---|---|
| *G06F 21/62* | (2013.01) |
| *G06F 21/60* | (2013.01) |
| *H04L 29/06* | (2006.01) |
| *G09C 1/00* | (2006.01) |
| *H04L 9/32* | (2006.01) |

(52) U.S. Cl.
CPC ........ *G06F 21/6245* (2013.01); *G06F 21/602* (2013.01); *G06F 21/6227* (2013.01); *G09C 1/00* (2013.01); *H04L 9/3213* (2013.01); *H04L 63/102* (2013.01); *H04L 63/105* (2013.01); *G06F 2221/2141* (2013.01)

(58) Field of Classification Search
CPC ............... G06F 21/6245; G06F 21/602; G06F 21/6227; G06F 2221/2141; H04L 63/102; H04L 63/105; H04L 9/3213; H04L 9/0894; H04L 9/0866; H04L 63/0428; H04L 63/101; G09C 1/00
See application file for complete search history.

(56) References Cited

U.S. PATENT DOCUMENTS

| | | | |
|---|---|---|---|
| 10,303,895 B1 * | 5/2019 | McCluskey | G06Q 40/123 |
| 2013/0097430 A1 * | 4/2013 | Mittelstadt | G06F 21/6227 713/189 |
| 2013/0159731 A1 * | 6/2013 | Furukawa | H04L 9/14 713/189 |
| 2013/0179684 A1 * | 7/2013 | Furukawa | H04L 9/0894 713/165 |
| 2013/0268750 A1 * | 10/2013 | Furukawa | H04L 9/3066 713/153 |
| 2015/0033032 A1 * | 1/2015 | Furukawa | H04L 9/0894 713/189 |
| 2017/0104762 A1 * | 4/2017 | Feng | G06F 21/6227 |
| 2018/0089196 A1 * | 3/2018 | Kenthapadi | G06F 16/254 |

(Continued)

*Primary Examiner* — J. Brant Murphy
(74) *Attorney, Agent, or Firm* — Schwegman Lundberg & Woessner, P.A.

(57) ABSTRACT

In order to handle the security issues with regards to maintaining privacy of the submitted confidential data, in an example embodiment, no single service is permitted to access both confidential data and member identity data. This design ensures that an attacker would have to compromise more than two services to be able to associate a member with their corresponding compensation data. Thus, member privacy would be preserved if there were any single point of breach. In an example embodiment, an approach is taken where it is still possible for a member to delete his or her confidential data information.

20 Claims, 17 Drawing Sheets

400

| CONFIDENTIAL DATA 402 | MEMBER ID 404 | TIMESTAMP 406 | FIRST ATTRIBUTE 408 | SECOND ATTRIBUTE 410 | TRANSACTION ID 412 |
|---|---|---|---|---|---|
| XXX | YYY | 5/31/16 04:15:15 | SAN FRANCISCO | SOFTWARE ENGINEER | 8435835 |
| XXX | YYY | 5/31/16 10:15:12 | LOS ANGELES | SOFTWARE ENGINEER | 7293275 |
| XXX | YYY | 6/1/16 01:12:12 | LOS ANGELES | PRODUCT MANAGER | 5761191 |
| XXX | YYY | 6/2/16 23:15:59 | DALLAS | VICE PRESIDENT, SALES | 1549985 |
| XXX | YYY | 6/3/16 05:43:12 | NEW YORK | HR BUSINESS PARTNER | 8761840 |

(56) References Cited

U.S. PATENT DOCUMENTS

2018/0089442 A1\* 3/2018 Kenthapadi ......... G06F 21/6218
2018/0089443 A1\* 3/2018 Kenthapadi ......... G06F 21/6218
2018/0089444 A1\* 3/2018 Kenthapadi ......... G06F 21/6245

\* cited by examiner

| CONFIDENTIAL DATA 402 | MEMBER ID 404 | TIMESTAMP 406 | FIRST ATTRIBUTE 408 | SECOND ATTRIBUTE 410 | TRANSACTION ID 412 |
|---|---|---|---|---|---|
| XXX | YYY | 5/31/16 04:15:15 | SAN FRANCISCO | SOFTWARE ENGINEER | 8435835 |
| XXX | YYY | 5/31/16 10:15:12 | LOS ANGELES | SOFTWARE ENGINEER | 7293275 |
| XXX | YYY | 6/1/16 01:12:12 | LOS ANGELES | PRODUCT MANAGER | 5761191 |
| XXX | YYY | 6/2/16 23:15:59 | DALLAS | VICE PRESIDENT, SALES | 1549985 |
| XXX | YYY | 6/3/16 05:43:12 | NEW YORK | HR BUSINESS PARTNER | 8761840 |

URL bar: HTTPS://WWW.LINKEDIN.COM/JOBS/SEARCH/?CURRENTJOBID=987297124

Tabs: CSRF · CRT · HOST · CALL · ENG TE · LI TO · SALARY · EMBE · SEAR · LEA · VIM CHEA · SEARCH HOME » BOOKMARKS · LIXR

[SEARCH JOBS] JOBS ▼ | DATE POSTED ▼ | LINKEDIN FEATURES ▼ | COMPANY ▼ | UNITED STATES | EXPERIENCE LEVEL ▼ | ALL FILTERS | SEARCH

— 600

SORT BY: RELEVANCE ▼ · ☐ SPLIT VIEW ▼

JOBS IN UNITED STATES
8,984,624 RESULTS — 602

🔔 JOB ALERT · OFF ⦿

INTERNET FEEDBACK

---

PRODUCT MARKETING MANAGER — 604A
WS
SAN FRANCISCO BAY AREA
WE'RE LOOKING FOR A PRODUCT MARKETING MANAGER TO JOIN OUR MARKETING TEAM WHO WILL...
💰 $70K POTENTIAL SALARY RAISE — 606A
NEW - ⚡ EASY APPLY

OFFICE MANAGER — 604B
CYSS HCM
MENLO PARK, CALIFORNIA
5+ YEARS OF EXPERIENCE MANAGING AN OFFICE AND/OR SERVING AS AN EXECUTIVE ASSISTANT. STRONG ORAL AND WRITTEN COMMUNICATIONS...
💰 $35K POTENTIAL SALARY RAISE — 606B
NEW - ⚡ EASY APPLY

SECURITY APPLICATION ENGINEER — 604C
NORTHLAND CONTROLS

---

JOB
- 0/10 SKILLS MATCH
- 0 APPLICANTS

COMPANY
- 1001-5000 EMPLOYEES
- HUMAN RESOURCES

CONNECTIONS
👤 1 ALUM

■ PREMIUM
SEND IN MAIL

JOB DESCRIPTION
POSTED BY
👤 GREG PARSE
CORPORATE RECRUITER AT LLL, INC.
RESPONSIBILITIES:
-LIAISON BETWEEN ACCOUNTING/PURCHASING (DOMESTIC AND INTERNATIONAL) AND IT FOR ALL AUTOMATED SUPPLIER CONNECTIONS GLOBALLY. THIS INCLUDERS CANADA, TANNER...
-CREATE AND PUBLISH STANDARD WORK DOCU...
-DEVELOP A STRATEGY TO IMPLEMENT AND MAN...
-PROVIDE DAY TO DAY INTERFACE WITH SUPPLI...
-DRIVE ALL NEW DOMESTIC EDI IMPLEMENTATIO...

SENIORITY LEVEL
MID-SENIOR LEVEL

INDUSTRY
HUMAN RESOURCES,
INFORMATION TECHNOLOGY & SER...
LOGISTICS & SUPPLY CHAIN

EMPLOYMENT TYPE
FULL-TIME

JOB FUNCTIONS
SUPPLY CHAIN, INFORMATION...
PURCHASING

CONFIDENTIAL DATA SECURITY

TECHNICAL FIELD

The present disclosure generally relates to computer technology for solving technical challenges in collection and maintenance of confidential data in a computer system. More specifically, the present disclosure relates to security of confidential data.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and only used for specific purposes, and it can be difficult to convince members to provide such confidential information due to their concerns that these technical challenges may not be met. Additionally, it can be difficult to ensure accuracy and reliability of the confidential data.

BRIEF DESCRIPTION OF THE DRAWINGS

Some embodiments of the technology are illustrated, by way of example and not limitation, in the figures of the accompanying drawings.

FIG. 4 is a diagram illustrating an example of a submission table, in accordance with an example embodiment.

FIG. 6 is a screen capture illustrating the use of the submitted confidential data to present, in a graphical user interface, one or more job listings to a member, in an example embodiment.

FIG. 7 is a screen capture illustrating the use of the submitted confidential data to present, in a graphical user interface, one or more job listings to a member, in an example embodiment.

FIG. 8 is a screen capture illustrating the use of the submitted confidential data to alert, in a graphical user interface, a user of jobs that pay more than a threshold increase from the user's existing salary, in accordance with an example embodiment.

DETAILED DESCRIPTION

Overview

In an example embodiment, an architecture is provided that gathers confidential information from users, tracks the submissions of the confidential information, and maintains and utilizes the confidential information in a secure manner while ensuring that the confidential information is accurate and reliable.

Confidential data could then be accessed in a two pass process. In a first pass, a submission service may be accessed. Specifically, the personalization service could request from the submission service an identification of a member who has submitted confidential data. The submission service would have access to the key used to decrypt the column of the submission table that contains member IDs, and thus would be able to retrieve and decrypt the appropriate identification. The submission service returns a token that contains this key to the personalization service. The submission service, however, would not have access to the key used to decrypt the actual submitted confidential data, and thus would not be able to access or decrypt that confidential data. The personalization service could then request that a data preparation service obtain the actual confidential data by including the token in the request. The data preparation service would have access to the key used to decrypt the actual submitted confidential data, and thus would be able to access and decrypt the confidential data. The data preparation service, however, would not have access to the key used to decrypt the member identification information.

DETAILED DESCRIPTION OF SPECIFIC EMBODIMENTS

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Figure 1:
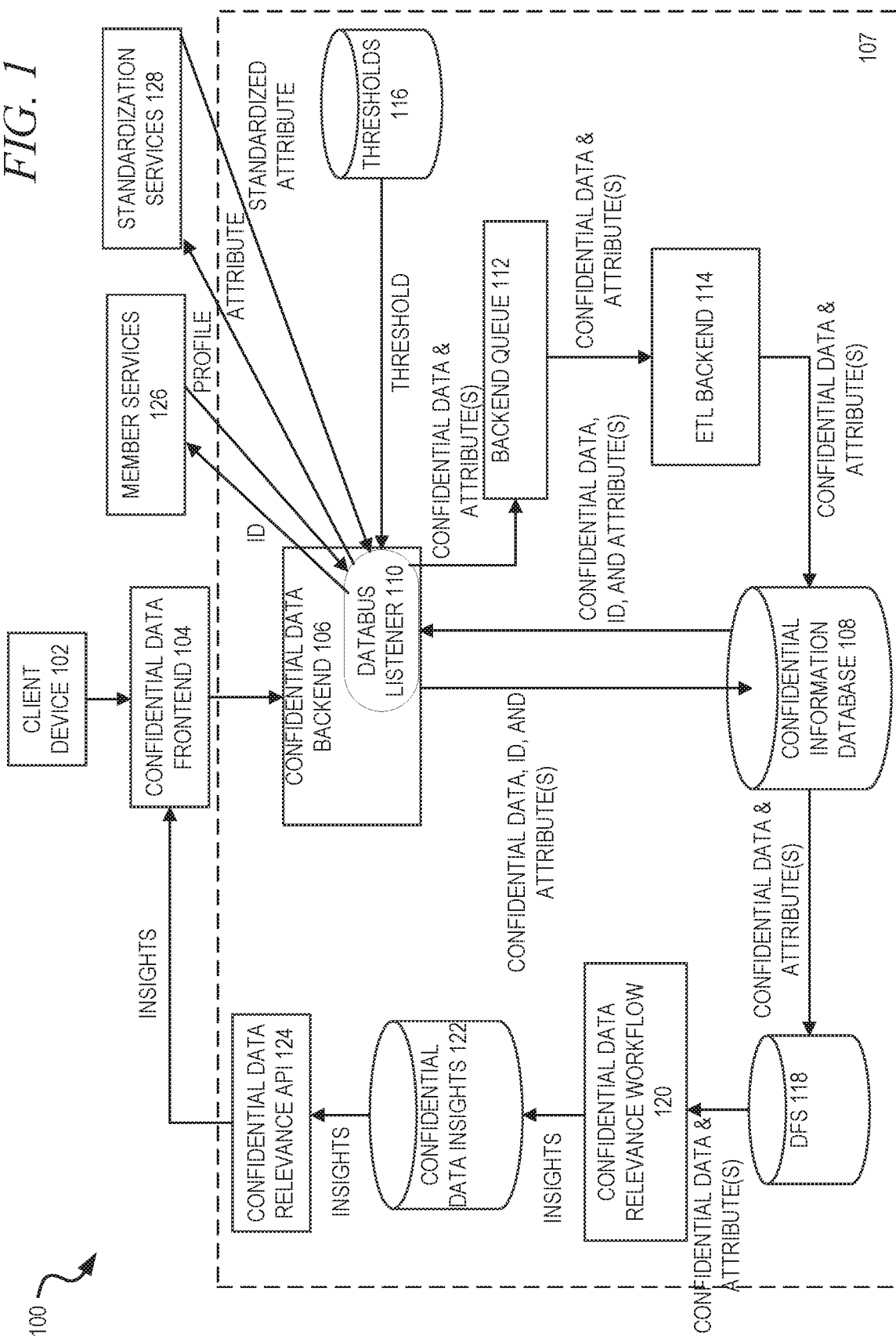
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to the confidential data backend 106. In some example embodiments, the confidential data backend 106 is located on a server-side or cloud platform 107 while the confidential data frontend 104 is directly connected or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as Javascript code, in addition to Hypertext Markup Language (HTML) and Cascade Style Sheets (CSS) code designed to perform various tasks that will be described in more detail below. The web page may be served in response to the user selecting a link in a previous communication or web page. For example, the link may be displayed in an email communication to the user, or as part of a feed section of a user's social networking service member page. This allows the system 100 to selectively target users to request that they submit confidential information. For example, the system 100 may determine there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a stand-alone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. Due to the reluctance of users to provide certain types of confidential data, in an example embodiment, insights from the confidential data contributed by other users are withheld from a user until the user contributes his or her own confidential data. As will be described in more detail, a mechanism to ensure that the contribution of confidential data is tracked is provided.

Once received from the user, the confidential data frontend 104 may transmit the confidential data along with an identification of the user (such as a member identification reflecting the user's account with a social networking service) to the confidential data backend 106. In an example embodiment, this may be performed via, for example, a REST application program interface (API).

The confidential data, along with the identification of the user, may be stored in a submission table by the confidential data backend 106 in the confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the compensation data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has not previously submitted confidential data or has not submitted confidential data within some predetermined time period (e.g., within the last year), then the confidential data backend 106 may indicate to the confidential data frontend 104 that it should not share insights from confidential data from other users with this particular user until this particular user submits confidential data (or submits updated confidential data in the case where the particular user had submitted confidential data previously).

There may be other methods for determining eligibility of a user for receiving insights from submissions from other users than those described above. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member) to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational level, and the like. It should be noted that it is not necessary for these attributes to be stored in the submission table. Since an identification of the user is available in the submission table, it may be possible to retrieve the attributes for the user on an as needed basis, such as by querying a social networking service with the user identification when needed.

A databus listener 110 then detects when new confidential data is added to the confidential information database 108 and triggers a workflow to handle the new confidential data. First, it queries a thresholds data store 116 to determine if one or more thresholds have been met. Specifically, until a certain number of data points for confidential data have been met, the system 100 will not act upon any particular confidential data data point. As will be described in more detail later, these thresholds may be created on a per-slice basis. Each slice may define a segment of users upon which insights may be gathered based on data points from confidential data submitted by users in the slice. For example, one slice may be users with the title "software engineer" located in the "San Francisco Bay Area." If, for example, the confidential data is compensation information, then it may be determined that, in order to gain useful insights into the compensation information for a particular title in a particular region, at least 10 data points (e.g., compensation information of 10 different users) are needed. In this case, the threshold for "software engineer" located in "San Francisco Bay Area" may be set at 10. The databus listener 110 therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be transgressed, and, if so, or if the threshold had already been exceeded, insert the data in a backend queue 112 for extract, transform, and load (ETL) functions.

In an example embodiment, the thresholds data store 116 contains not just the thresholds themselves but also maintains a running count of how many data points have been received for each slice. In other words, the thresholds data store 116 indicates how close the slice is to having enough data points with which to provide insights. The databus listener 110 may reference these counts when making its determination that a newly submitted data point causes a threshold to be transgressed. Running counts of data points received for each slice are updated in thresholds 116 by confidential data backend 106.

Since the databus listener 110 only transfers data points for a particular slice to the backend queue 112 once the threshold for that slice has been transgressed, the confidential data data points corresponding to that slice may need to be retrieved from the confidential information database 108 once the threshold is determined to be transgressed. For example, if, as above, the threshold for a particular slice is 10 data points, the first 9 data points received for that slice may simply be left in the confidential information database 108 and not sent to the backend queue 112. Then, when the 10th data point for the slice is stored in the confidential information database 108, the databus listener 110 may determine that the threshold has been transgressed and retrieve all 10 data points for the slice from the confidential information database 108 and send them to the backend queue 112 for processing.

It should also be noted that any one piece of confidential data may correspond to multiple different slices and thus the databus listener 110 may, in some example embodiments, provide the same confidential data to the backend queue 112 multiple times. This can occur at different times as well, because each of the slices may have their own threshold that may be transgressed at different times based on different counts. Thus, for example, compensation data for a user in the San Francisco Bay Area with a job title of "software developer" and a school attended as "Stanford University" may be appropriately assigned to one slice of software developers in the San Francisco Bay area, a slice of "Stanford University" alums, and a slice of software developers in the United States. All slices may have their own thresholds 116 and counts from confidential data from other users, who may or may not have complete overlap with these three slices.

An ETL backend 114 acts to extract, transform, and load the confidential data and group it and place it back in the confidential information database 108 in a different location.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the confidential data and slice information into an ETL table corresponding to the slice in the confidential information database 108. This ETL table may be stored in a different location than the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights on the relevant information in a confidential data insights data store 122. A confidential data relevance API 124 may then be utilized to provide insights from the confidential data insights data store 122 to the confidential data frontend 104, which can then display it to a user. As described earlier, these insights may be provided only on a "give-to-get" basis, namely that only users who provide confidential information (and/or provide it recently) can view insights.

Figure 2A:
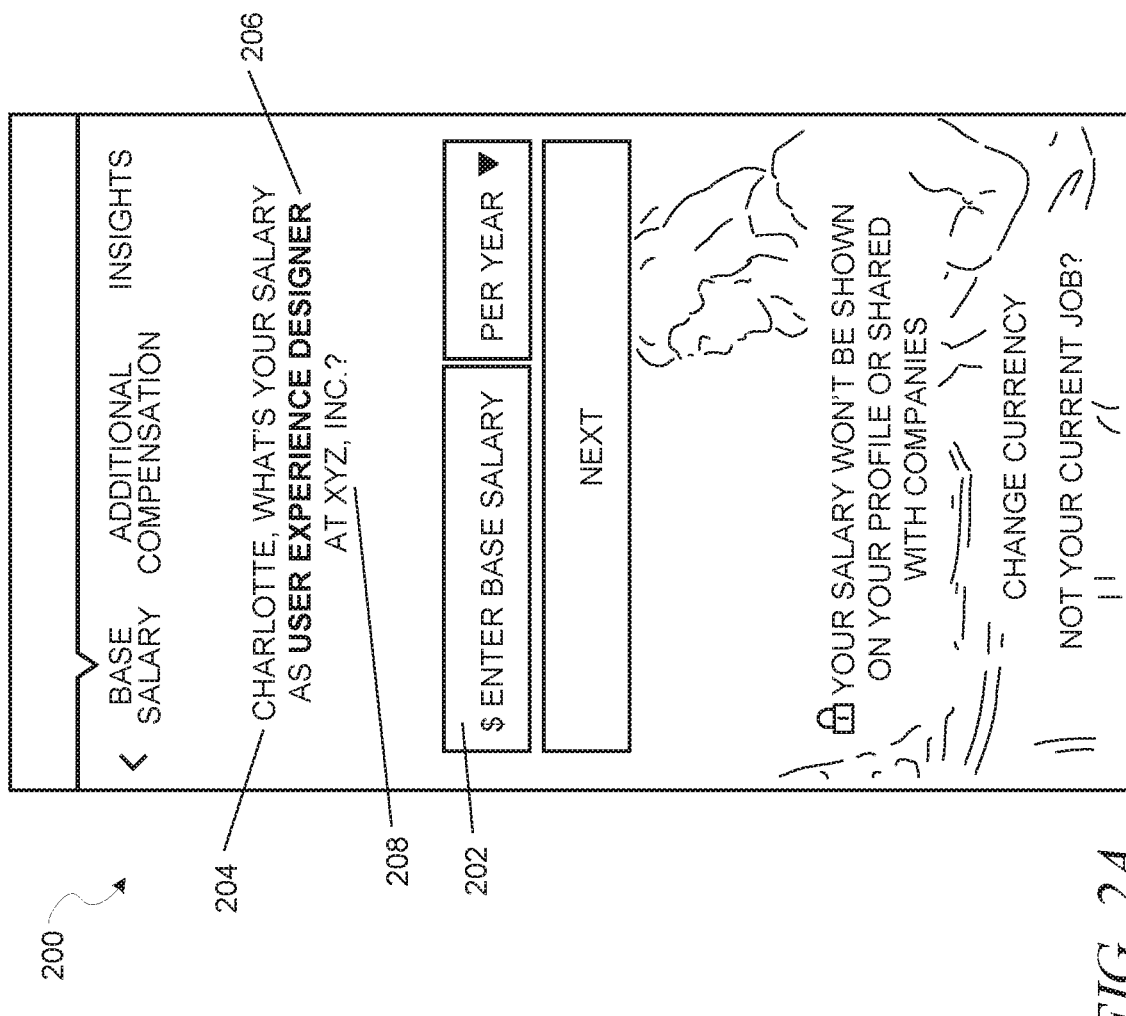
FIGS. 2A-2C are screen captures illustrating examples of a user interface provided by the confidential data frontend, in accordance with an example embodiment.
Figure 2B:
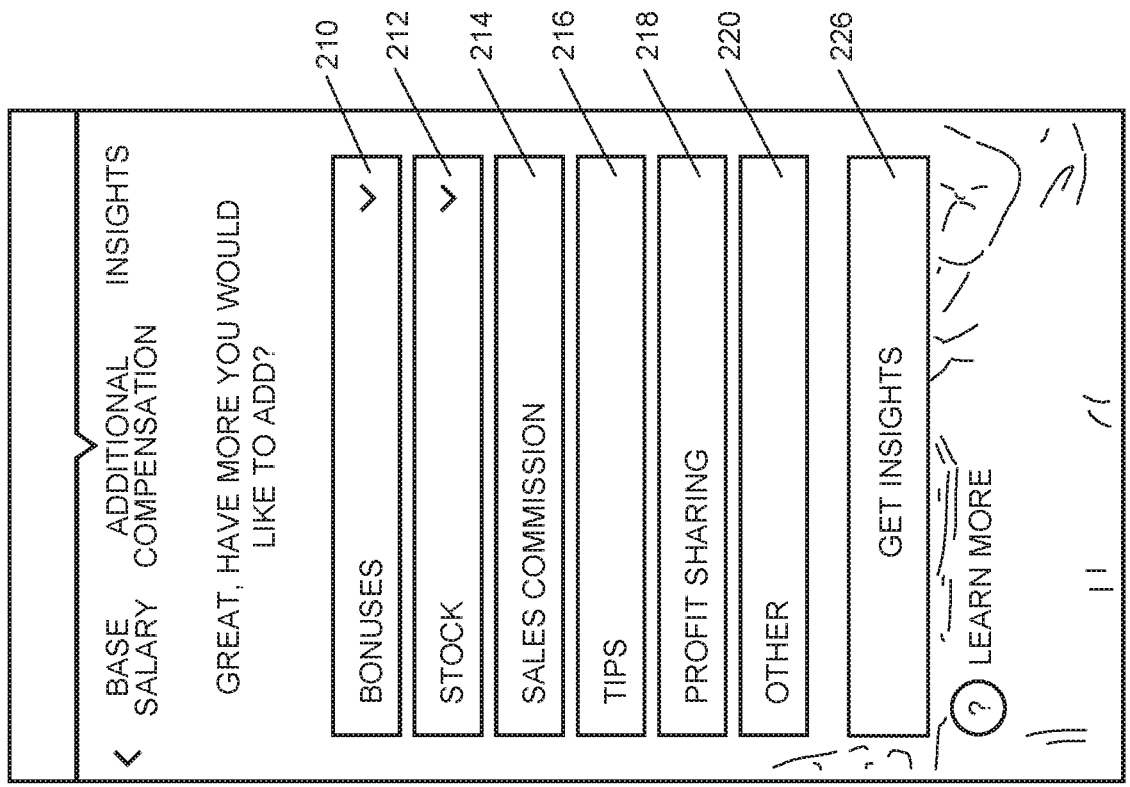
Figure 2C:
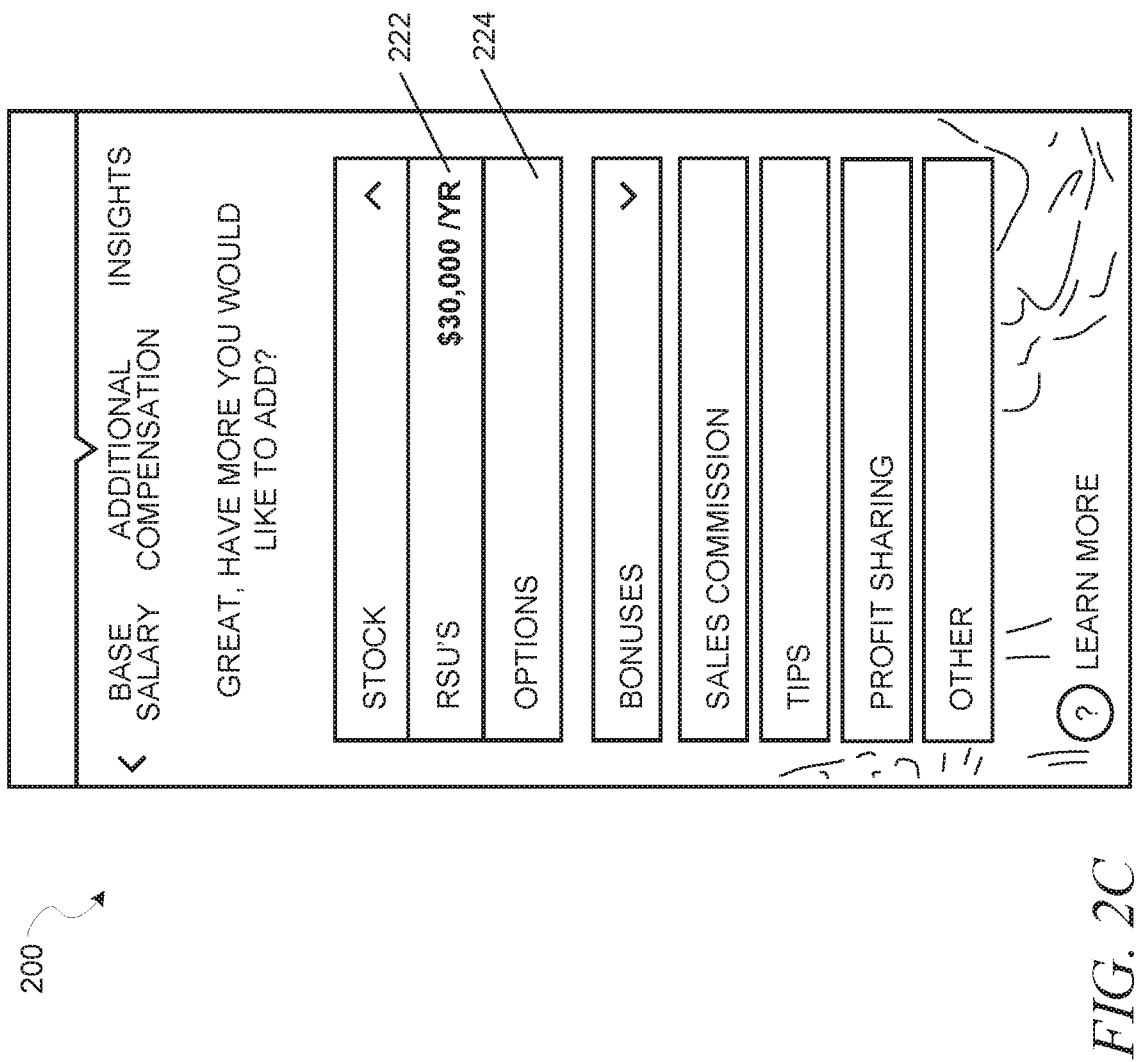

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a stand-alone application operating on a mobile device, such as a smartphone. In FIG. 2A, the user is prompted to enter a base salary in text box 202, with a drop down menu 204 providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or from completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types 210-220 appropriate for his or her current job, a "Get insights" button 226 may be selected, which launches a process by which the confidential data backend 106 determines whether the user is eligible to receive insights from compensation data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to place the confidential data in the appropriate ETL tables corresponding to the appropriate slices in which the confidential data belongs. This permits the submitted confidential data to be available for future insights.

Figure 3:
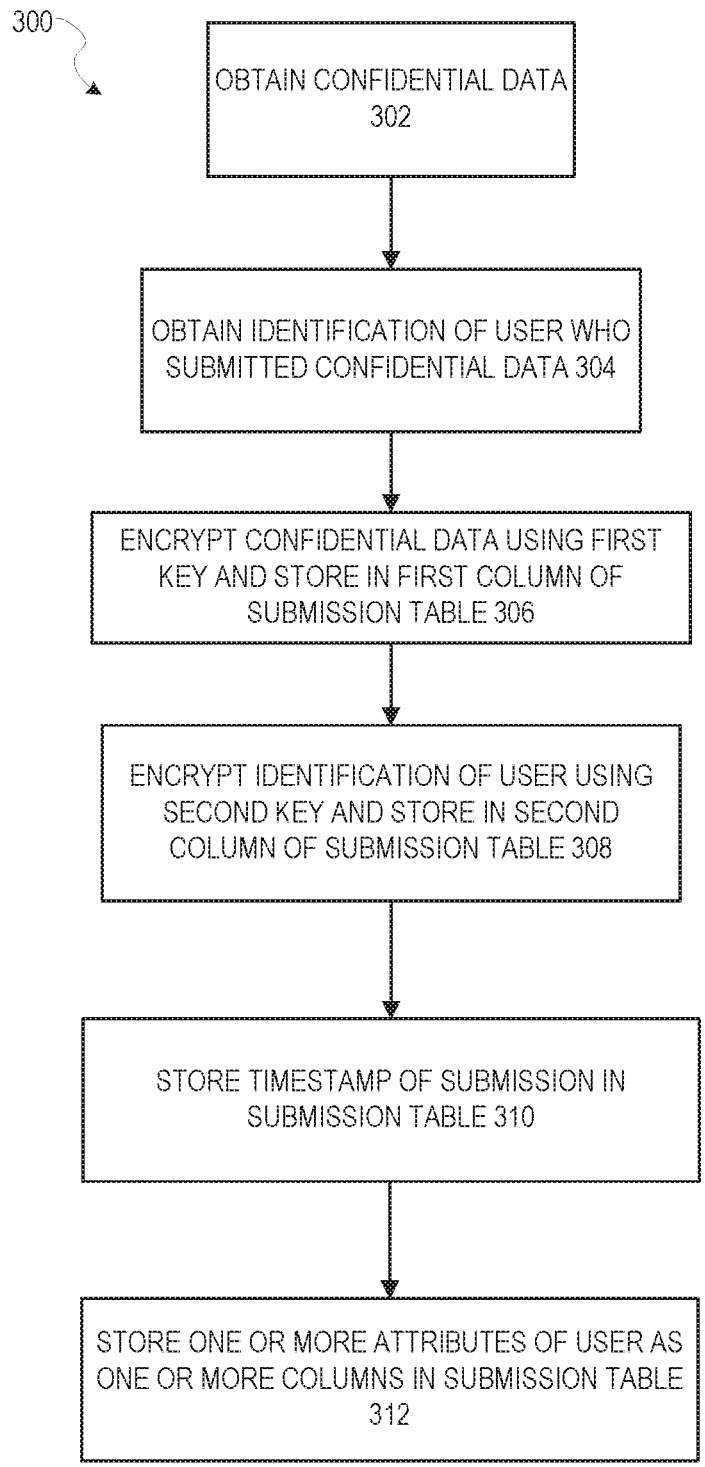
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, this method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302, 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third party service for the identification information for the user. Regardless, after operations 302 and 304 have been performed, the confidential data backend 106 now has at its disposal some confidential data and identification information for the user who entered the confidential data.

It should be noted that the confidential data may either be a single piece of information, or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database 108. Then at operation 308, the identification of the user who submitted the confidential data is separately encrypted using a second key and stored in a second column of the submission table in the confidential information database 108.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for submission is stored. In a fourth column 408, a first attribute of the user, here location, is stored. In a fifth column 410, a second attribute of the user, her title, is stored. Of course, there may be additional columns to store additional attributes or other pieces of information related to the submission. In a sixth column 412, a transaction identification is stored.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table 400, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table 400. Nevertheless, the processes described herein with regard to the "column" in which the confidential data is stored apply equally to the embodiments where multiple columns are used (e.g., the individual pieces of compensation information are still encrypted separately from the user identification information).

In order to handle the security issues with regards to maintaining privacy of the submitted confidential data, in an example embodiment, no single service is permitted to access both confidential data and member identity data. This design ensures that an attacker would have to compromise more than two services to be able to associate a member with their corresponding compensation data. Thus, member privacy would be preserved if there were any single point of breach. In an example embodiment, an approach is taken where it is still possible for a member to delete his or her confidential data information.

Figure 5:
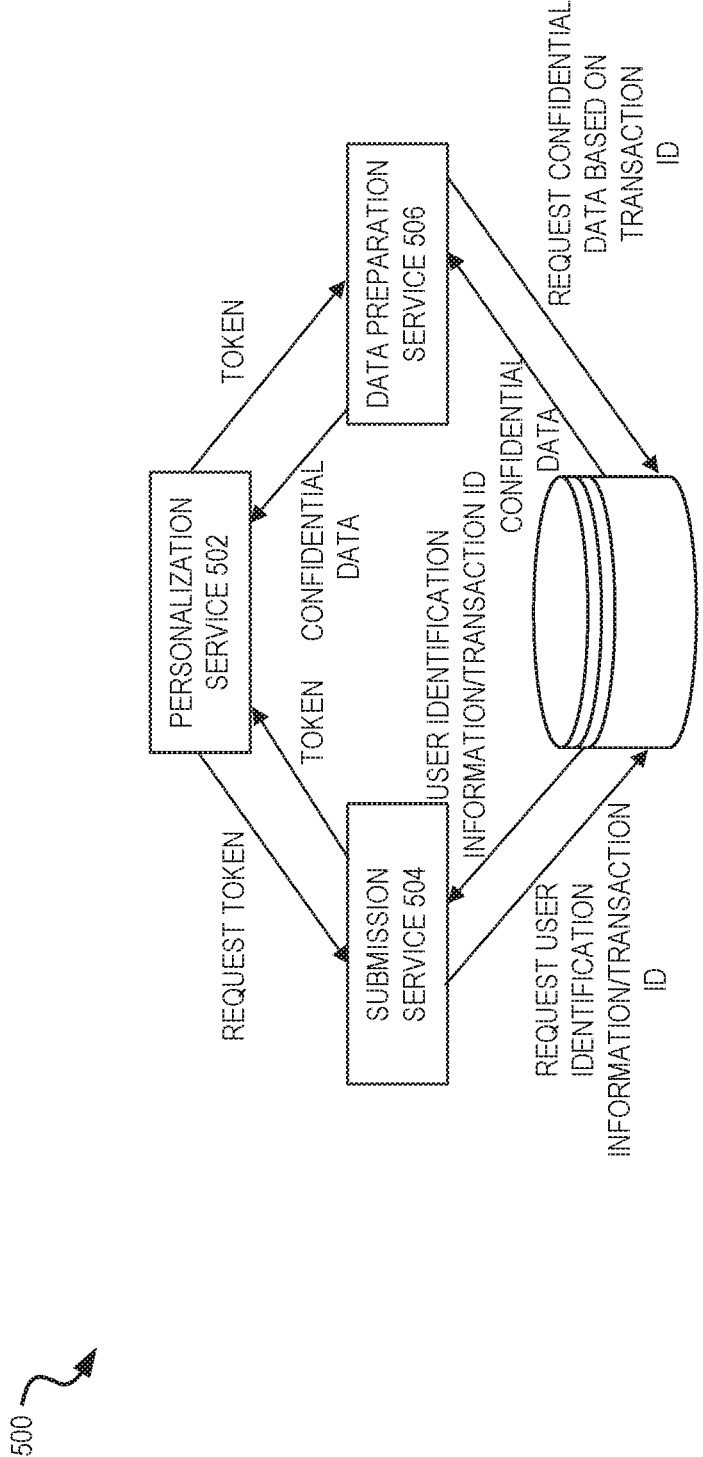
FIG. 5 is a block diagram illustrating a solution for maintaining privacy of submitted confidential data, in accordance with an example embodiment.

FIG. 5 is a block diagram illustrating a solution 500 for maintaining privacy of submitted confidential data, in accordance with an example embodiment. Here, for example, a personalization service 502 wishes to provide some information regarding confidential data that it needs both the member identifier and the underlying confidential data for. An example might be a job recommendation service that provides a member with information about how much of a salary increase a particular job opportunity would afford the member. For such a presentation, the personalization service 502 would need to know the member's exact salary.

Confidential data could then be accessed in a two pass process. In a first pass, a submission service 504 may be accessed. Specifically, the personalization service 502 could request from the submission service 504 an identification of a member who has submitted confidential data. The submission service 504 would have access to the key used to decrypt the column of the submission table 400 that contains member IDs, and thus would be able to retrieve and decrypt the appropriate identification. The submission service 504 returns a token that contains this key to the personalization service 502. The submission service 504, however, would not have access to the key used to decrypt the actual submitted confidential data, and thus would not be able to access or decrypt that confidential data. The personalization service 502 could then request that a data preparation service 506 obtain the actual confidential data by including the token in the request. The data preparation service 506 would have access to the key used to decrypt the actual submitted confidential data, and thus would be able to access and decrypt the confidential data. The data preparation service 506, however, would not have access to the key used to decrypt the member identification information.

In an example embodiment, two mechanisms are used to validate a member's identity to ensure that only the member is able to request his or her own confidential data. The first mechanism involves validating the member identification against an invocation context. The invocation context contains a member's identity information for an application program interface (API) request. The first mechanism compares the member identity information in the invocation context to the member identification in the request to ensure that one member cannot request another member's confidential data. Any non-matching requests can be blocked or discarded, while only matching requests are fulfilled.

The second mechanism is to validate the member identification in the request against the returned token. The token does not solely associate with the member's salary submission. Rather, it is ciphertext generated by encrypting the submission identification and the member identification of the member who submitted the associated confidential data. The data preparation service 506 decrypts this ciphertext and deserializes it back into the member identification of the member that submitted the confidential data and a submission identification. The data preparation service 506 is then able to verify that the requesting member ID matches the member identification of the member that submitted the confidential data.

In further example embodiments, application-level authorization can be applied to allow only authorized applications to request the confidential information.

For further security, in an example embodiment, the personalization service 502 never persists the confidential data. It is merely used in transient form in presenting information to the member that submitted the confidential data.

FIG. 6 is a screen capture illustrating the use of the submitted confidential data to present, in a graphical user interface 600, one or more job listings to a member, in an example embodiment. The graphical user interface 600 has a first area 602 in which brief summaries 604A-604C of relevant job postings for a member are displayed. For job postings where the salary offered is known, the above-described system is able to use the member's previously submitted salary to indicate how much of a monetary increase the job corresponding to the job posting would provide. Here, raise information 606A is provided for summary 604A and raise information 606B is provided for summary 604B Summary 604C may be for a job opening where salary information is unavailable. Notably, here raise information 606A-606B is presented in terms of the absolute increase in salary that the new job would provide.

Figure 7:
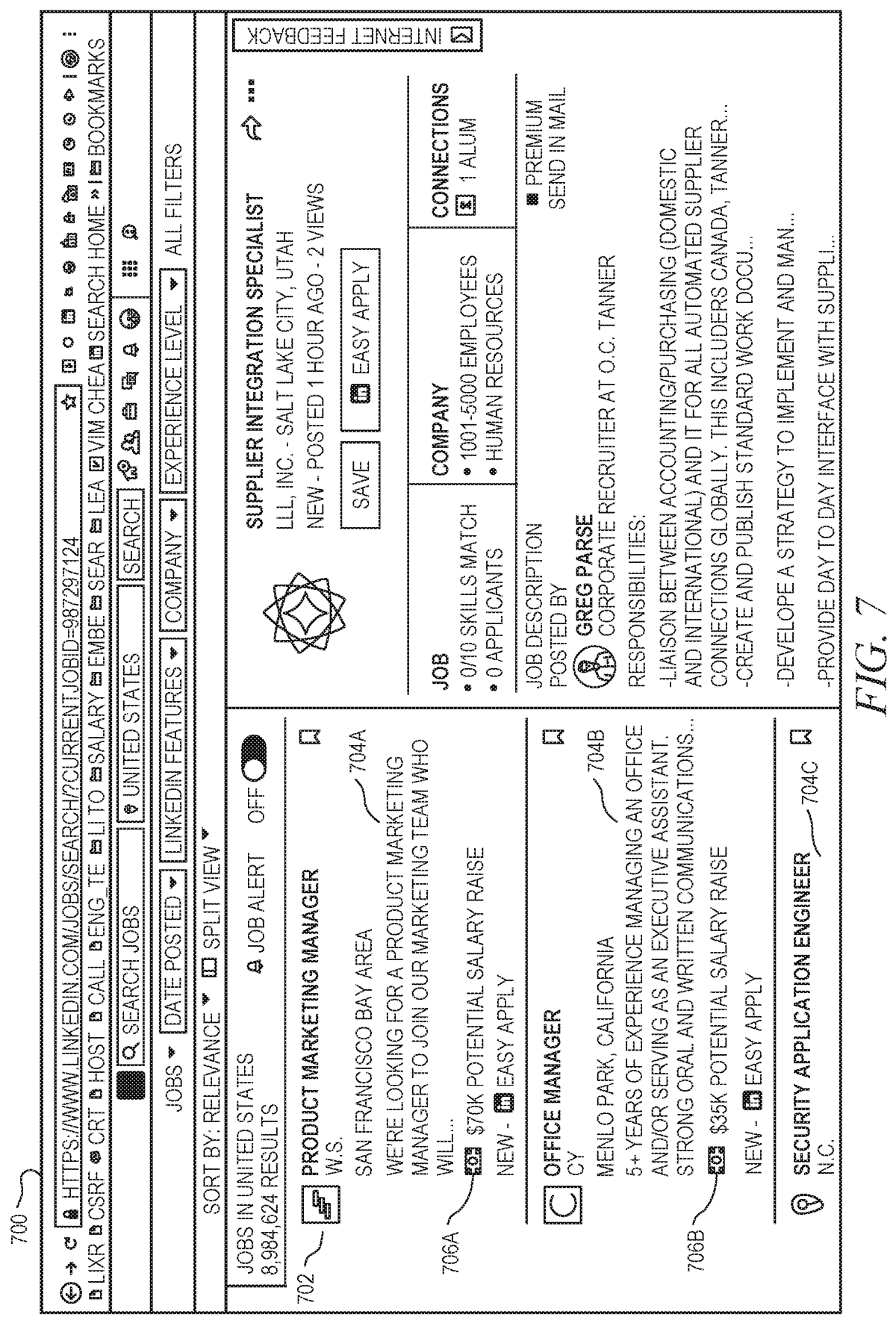

FIG. 7 is a screen capture illustrating the use of the submitted confidential data to present, in a graphical user interface 700, one or more job listings to a member, in an example embodiment. The graphical user interface 700 has a first area 702 in which brief summaries 704A-704C of relevant job postings for a member are displayed. For job postings where the salary offered is known, the above-described system is able to use the member's previously submitted salary to indicate how much of a monetary increase the job corresponding to the job posting would provide. Here, raise information 706A is provided for summary 704A and raise information 706B is provided for summary 704B. Summary 704C may be for a job opening where salary information is unavailable. Notably, here raise information 706A-706B is presented in terms of the relative increase in salary that the new job would provide (depicted as a percentage of the member's current salary).

Figure 8:
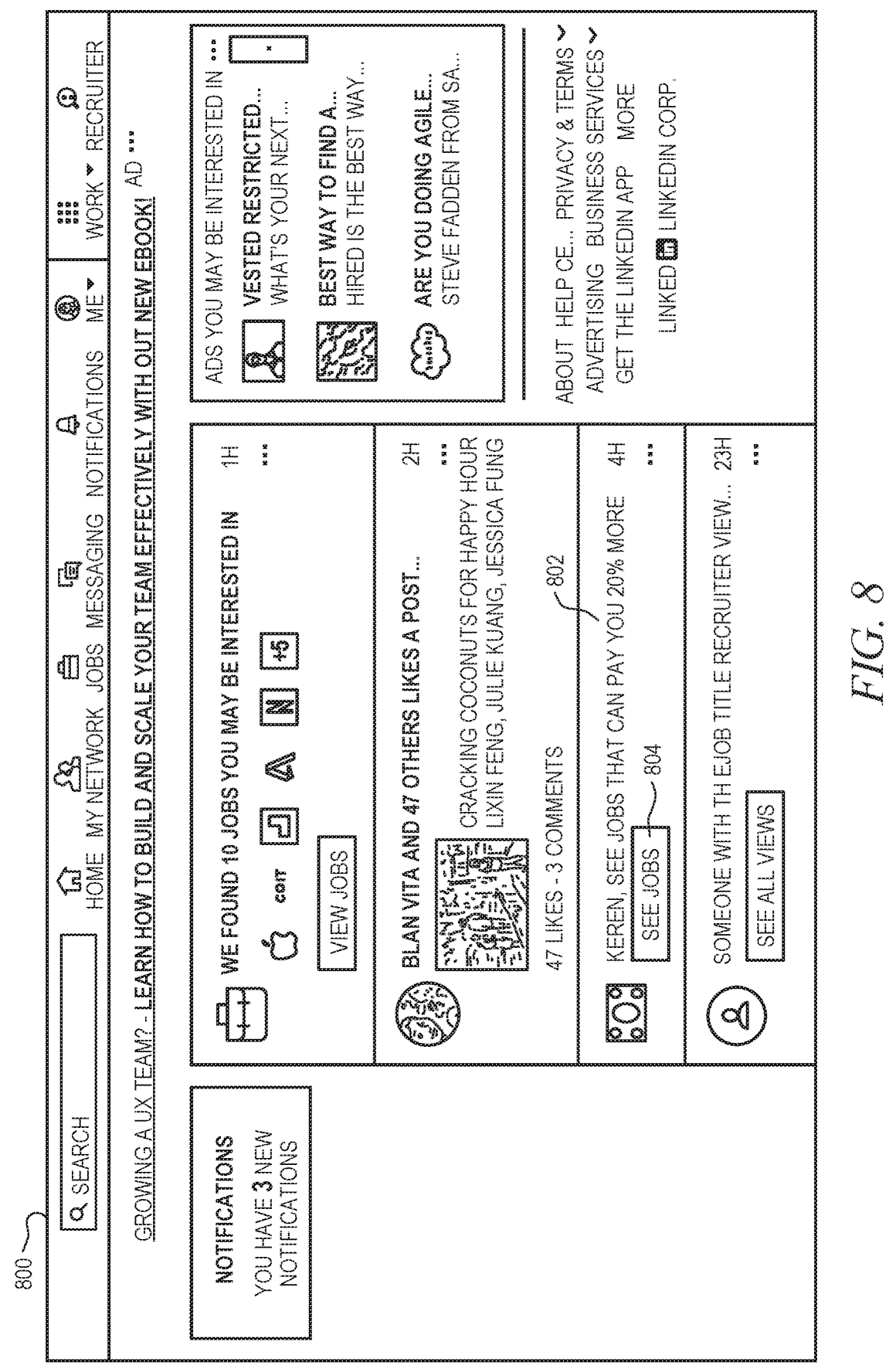

Other use cases for this submitted confidential data are available as well. FIG. 8 is a screen capture illustrating the use of the submitted confidential data to alert, in a graphical user interface 800, a user of jobs that pay more than a threshold increase from the user's existing salary, in accordance with an example embodiment. Here, this alert is presented as notification 802 with a corresponding button 804 the user can select to see the actual job listings that pay more than the threshold amount higher. In other example embodiments, this notification 802 may be presented in an email, text, or feed.

Figure 9:
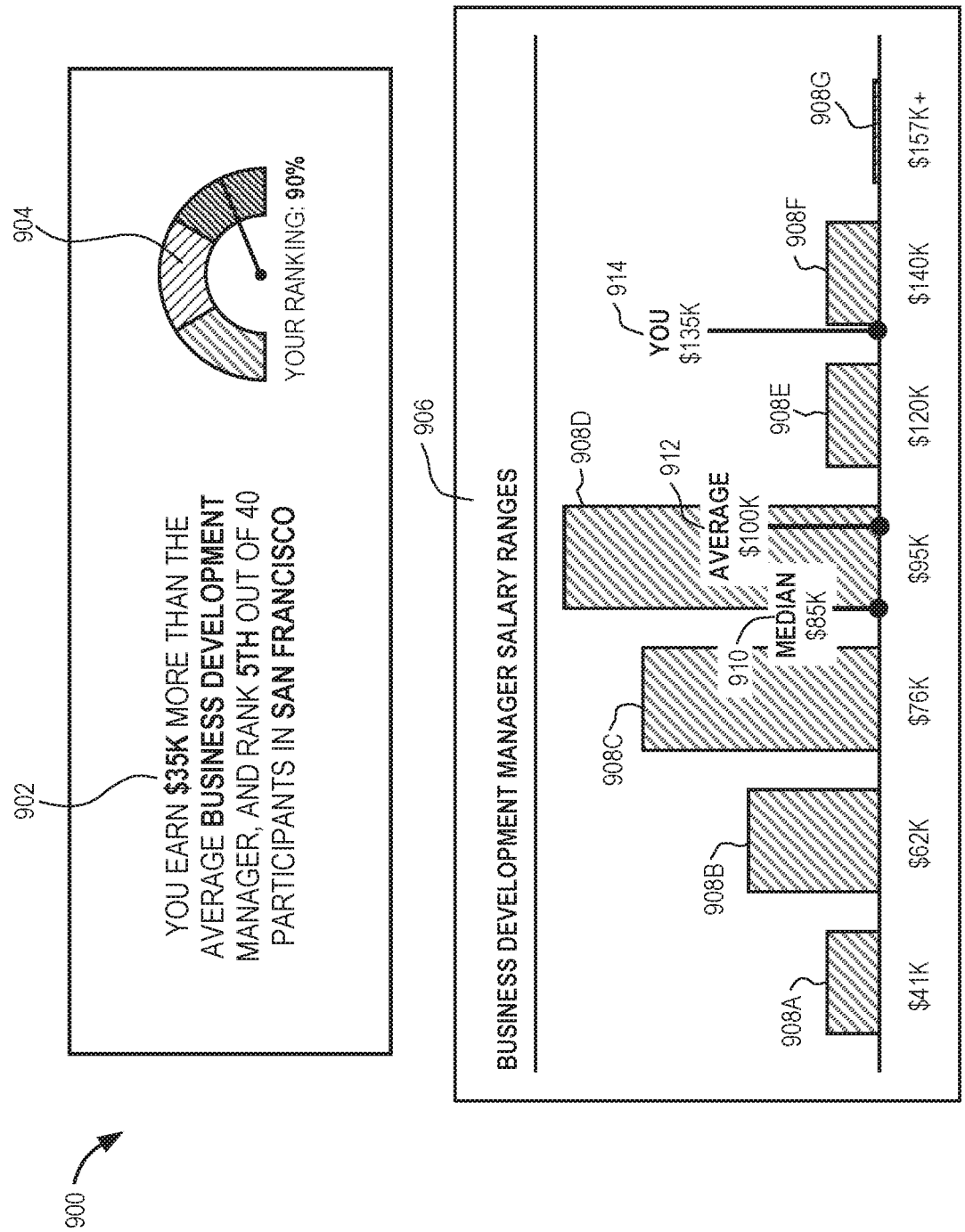
FIG. 9 is a screen capture illustrating the use of the submitted confidential data to provide metrics to the user in a graphical user interface, in accordance with an example embodiment.

FIG. 9 is a screen capture illustrating the use of the submitted confidential data to provide metrics to the user in a graphical user interface 900, in accordance with an example embodiment. Here the user may be presented with a text information box 902 that informs the user how their salary compares to others having their title in the same location as well as a graphical depiction 904 of their ranking in that cohort. Additionally, a histogram 906 can be presented of the various percentiles 908A-908G of salary ranges, with specific call-outs for median 910 and average 912 salaries as well as the user's salary 914.

In one example embodiment, the submitted confidential data may be used as part of a ranking algorithm to rank potential job postings to depict for the member (e.g., ranking jobs that would result in a pay cut very low).

In another example embodiment, the submitted confidential data can be used to make course recommendations for courses to increase the member's chances to get a raise or change jobs to a new job that pays more.

Figure 10:
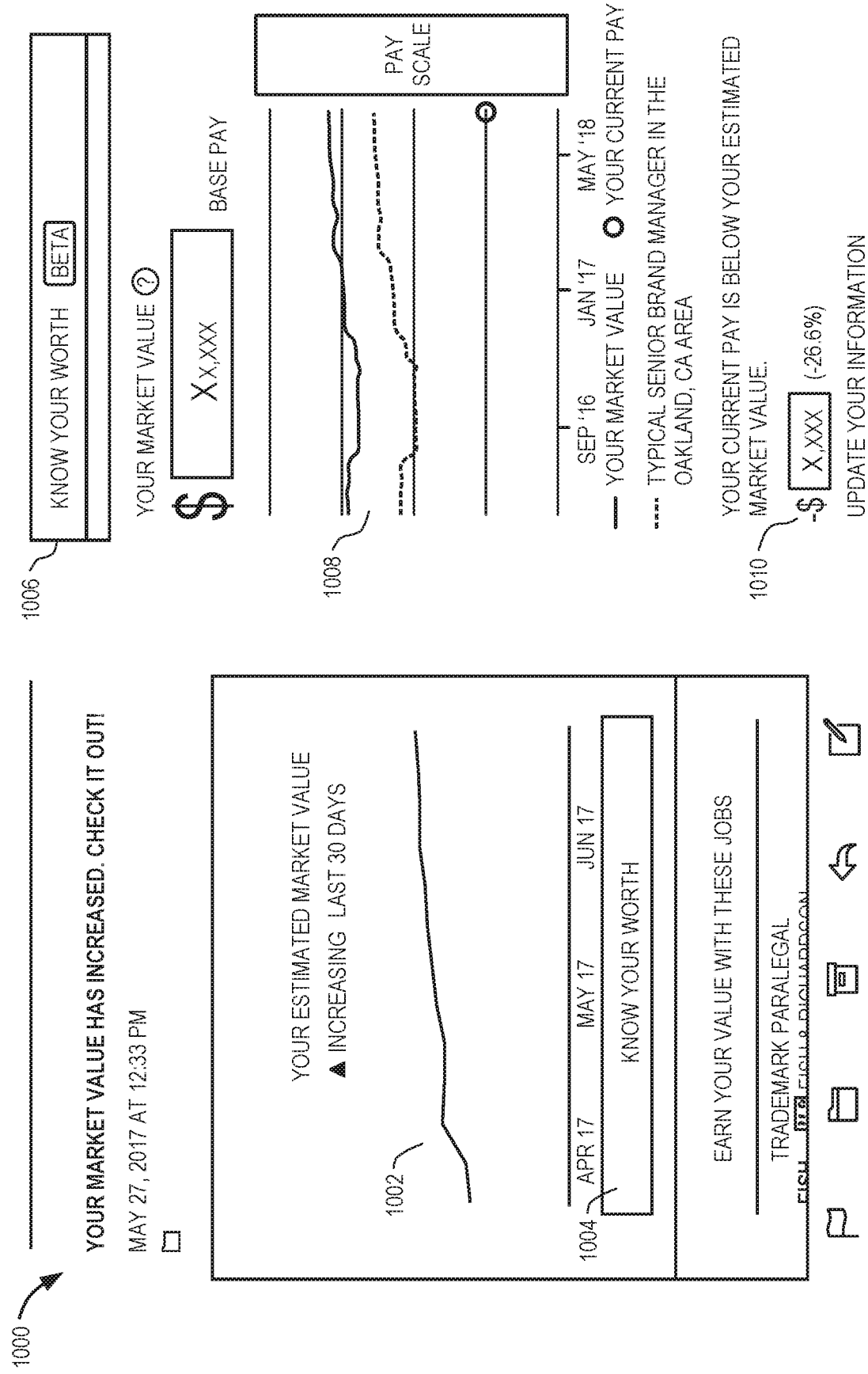
FIG. 10 is a screen capture illustrating the use of the submitted confidential data to present a graph in a graphical user interface, in accordance with an example embodiment.

In another example embodiment, the member may be presented with a graph showing earnings history with an extrapolation for earnings potential. FIG. 10 is a screen capture illustrating the use of the submitted confidential data to present a graph 1002 in a graphical user interface 1000, in accordance with an example embodiment. Here, the graph 1002 is also presented with a "know your worth" button 1004, which, when selected, launches graphical user interface 1006. Graphical user interface 1006 presents a graphical comparison 1008 of the user's current pay versus the user's market value and presents an indication 1010 of how much below or above market value the user's pay is.

Figure 11:
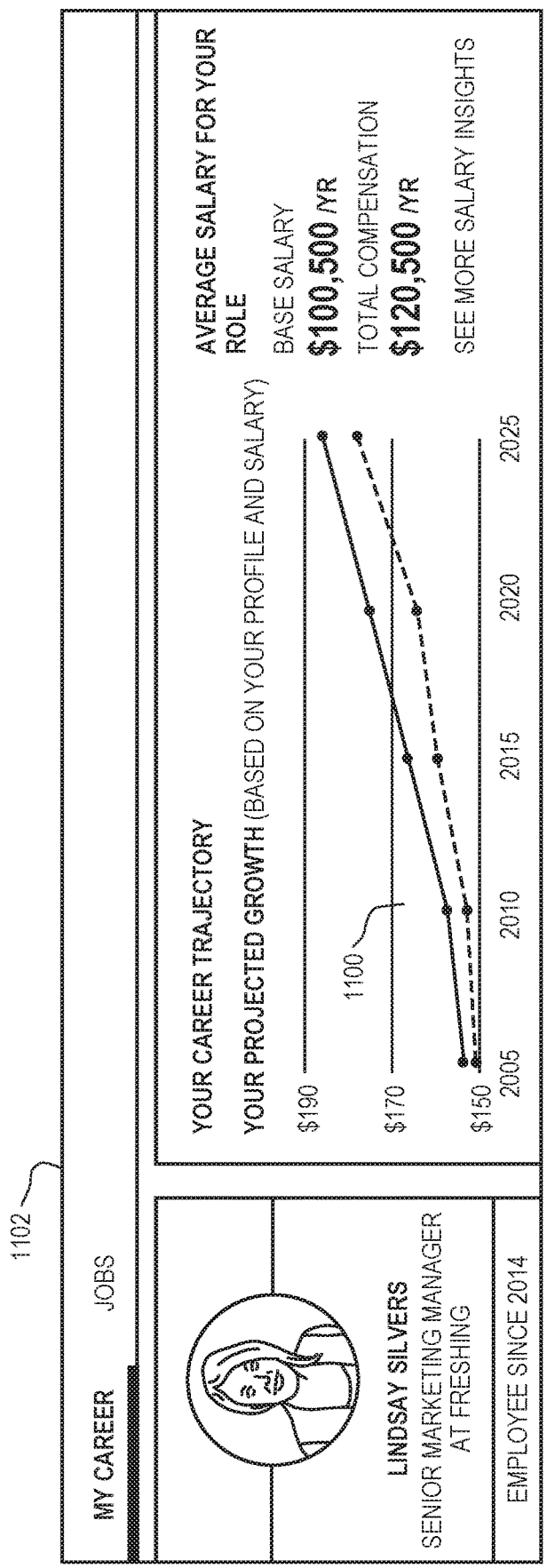
FIG. 11 is a screen capture illustrating the use of the submitted confidential data to present a graph of projected salary growth in a graphical user interface, in accordance with an example embodiment.

FIG. 11 is a screen capture illustrating the use of the submitted confidential data to present a graph of projected salary growth 1100 in a graphical user interface 1102, in accordance with an example embodiment.

Figure 12:
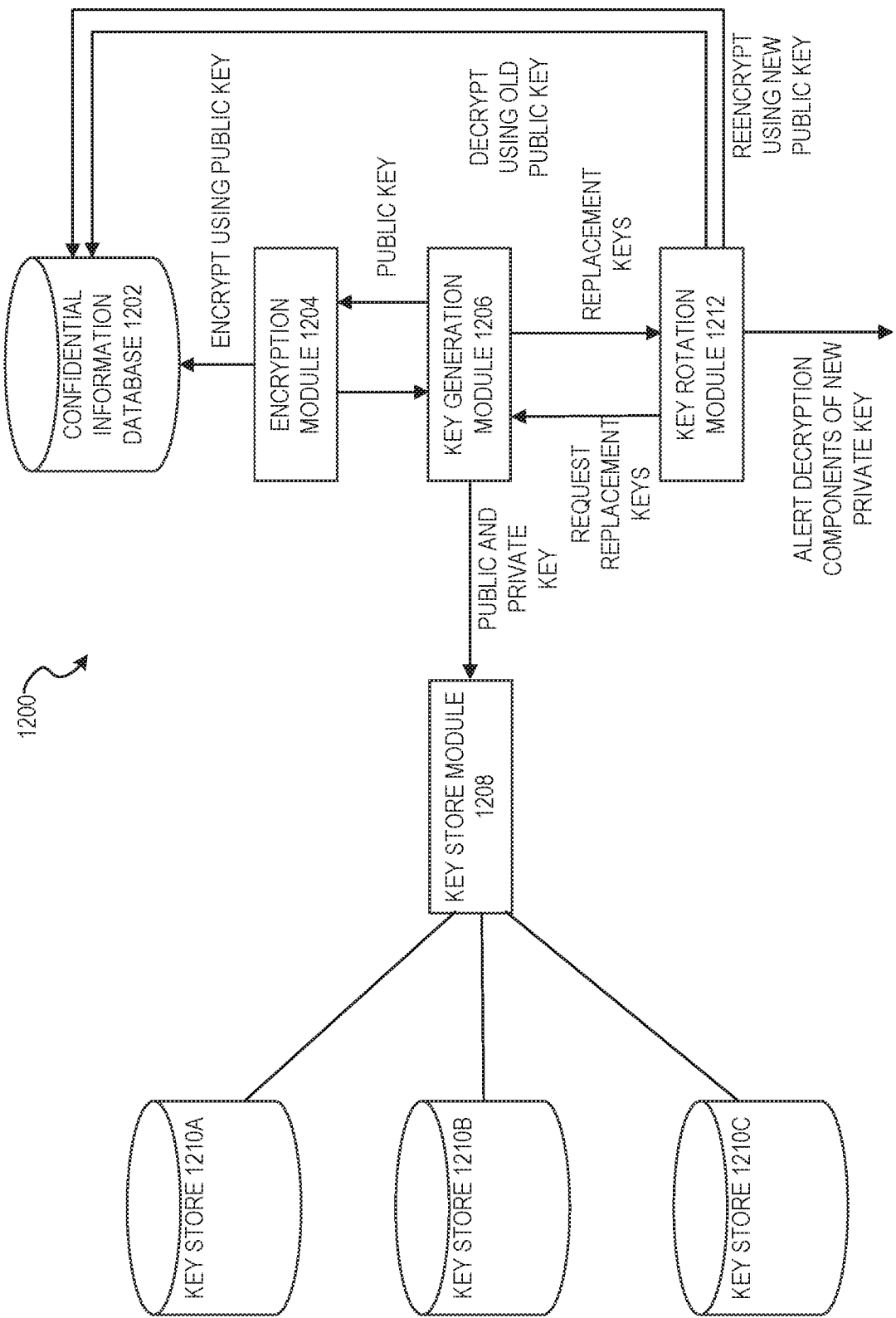
FIG. 12 is a block diagram illustrating a system for performing key rotation for keys encrypting one or more submission tables, in accordance with an example embodiment.

In another example embodiment, one or more of the keys are rotated. During this update, the data that was encrypted with the key being rotated is decrypted and encrypted with a new key, and the new key (or at least a key related to the new key) is sent out to any component that requests it to decrypt that data. FIG. 12 is a block diagram illustrating a system 1200 for performing key rotation for keys encrypting one or more submission tables 400, in accordance with an example embodiment. Here, the one or more submission tables 400 are stored in a confidential information database 1202. In an example embodiment, the confidential information database 1202 may be confidential information database 108 and/or thresholds data store 116 of FIG. 1. An encryption module 1204 may act to encrypt data in the confidential information database 1202. As was described earlier, the data that may be encrypted can be the confidential data itself (e.g., salary information), an identification of a user submitting the confidential data, and/or attributes of the user submitting the confidential data, and each of these pieces of information may be encrypted using a different key (or pair of keys). For discussion purposes in regards to FIG. 12, it is assumed that the confidential data is encrypted using a first public key in a first public-private key pair, the identification of the user who submitted the confidential data is encrypted using a second public key in a second public-private key pair, and the attributes of the user who submitted the confidential data are encrypted using a third public key in a third public-private key pair. The encryption module 1204 may, for example, act directly upon the information in the submission table(s) 400 in the confidential information database 1202 to encrypt the data.

When encryption is to be performed, the encryption module 1204 may request a public key for the data to be encrypted by a key generation module 1206. The key generation module 1206 may, for example, generate a public-private key pair for each type of data to be encrypted. The key generation module 1206 may then share the public key from the public-private key pair with the encryption module 1204. It should be noted that it is not necessary that the key generation module 1026 generate a new public key each time the encryption module 1204 needs to encrypt a piece of data. If the data is of a type that a key pair was already generated for and it is not time for key rotation, the encryption module 1204 may simply reuse a previous public key for that data type. It should also be noted that the key generation module 1206 shares only the public key portion of each public-private key pair, and not the private key portion, with the encryption module 1204. Thus, an attacker who gains access to the encryption module 1204 is not able to actually decrypt the data that it encrypts.

While the key generation module 1206 generates the keys, a key store module 1208 actually arranges for storage of keys. As was described earlier, in an example embodiment, each type of key (or key pair) is stored in a different key store 1210A, 1210B, 1210C. The key store module 1208 may manage this storage process. Thus, for example, the key store module 1208 may store the first private key in first key store 1210A, the second private key in second key store 1210B, and the third private key in third key store 1210C (the first, second, and third public keys do not need to be kept private, and thus storage of these keys in the key stores 1210A, 1210B, 1210C is optional).

A key rotation module 1212 may maintain various timers and/or rules indicating when keys should be rotated. A key is rotated by decrypting any data encrypted using the key, generating a new replacement key, and encrypting the decrypted data using the new replacement key. Any components that used the old key (or portion of the shared key pair) to decrypt data may be alerted that their old key has expired, thus necessitating a new request to the key store module 1208 when desiring to decrypt the re-encrypted data.

In an example embodiment, the key rotation module 1212 is designed so that no key or key pair is rotated when another key or key pair is being rotated. This helps ensure that an attacker who gains access to the key rotation module 1212 itself would only, at best, gain access to a single key or key pair. Thus, for example, if the first private key is being rotated, the second private key will not be rotated during that time that the first private key is being rotated. It is permissible, however, for example, for the first public key to be rotated at the same time as the first private key because they are part of the same key pair (and, of course, because the first public key is not confidential and thus access to the first public key is not a threat to data security).

The design of the key rotation module 1212 to ensure that the above protections are in place may depend on how the key rotation mechanism is designed in the first place. In an example embodiment, each key or key pair combination used for decryption may be rotated on a periodic basis. In such embodiments, the periods for the rotations may be set such that there is no overlapping rotations performed at the same time. For example, different periods (expressed in days) could be selected for each key, and further, the rotations could be scheduled at different times (e.g., 4 am, 12 pm, 8 pm) during the day to minimize the likelihood of overlap. In addition, the periods could be chosen to be mutually coprime integers (integers chosen such that the greater common divisor is 1 for any pair, e.g., 6, 12, 13) to minimize the likelihood of the rotation being performed on the same day.

In other embodiments, keys or key pairs may be rotated on demand, such as, for example, when some threshold of security risk to the previous keys or key pairs is detected. For example, if a security breach is attempted on a first component that utilizes a first private key for decryption, the first private key may be immediately rotated, regardless of whether or not a particular period of time has passed since last rotation. A lock-out or other mechanism may be used to prevent any other key pair from being rotated while the first private key is being rotated.

When the key rotation module 1212 determines that it is time to rotate a particular key pair, the private key portion of the key pair is used to decrypt the data. The key rotation module 1212 requests that the key generation module 1206 generate a new public key-private key pair. The public key portion of the pair is used by the encryption module 1204 to reencrypt the decrypted data. The private key portion of the pair is sent to the key store module 1208 for storage in the appropriate key store 1210A, 1210B, 1210C. Each component that uses the private key for decryption may also be alerted that the previous key is out of date, thus indicating that the component should, when decryption is warranted, request the updated private key from the key store module 1208.

Figure 13:
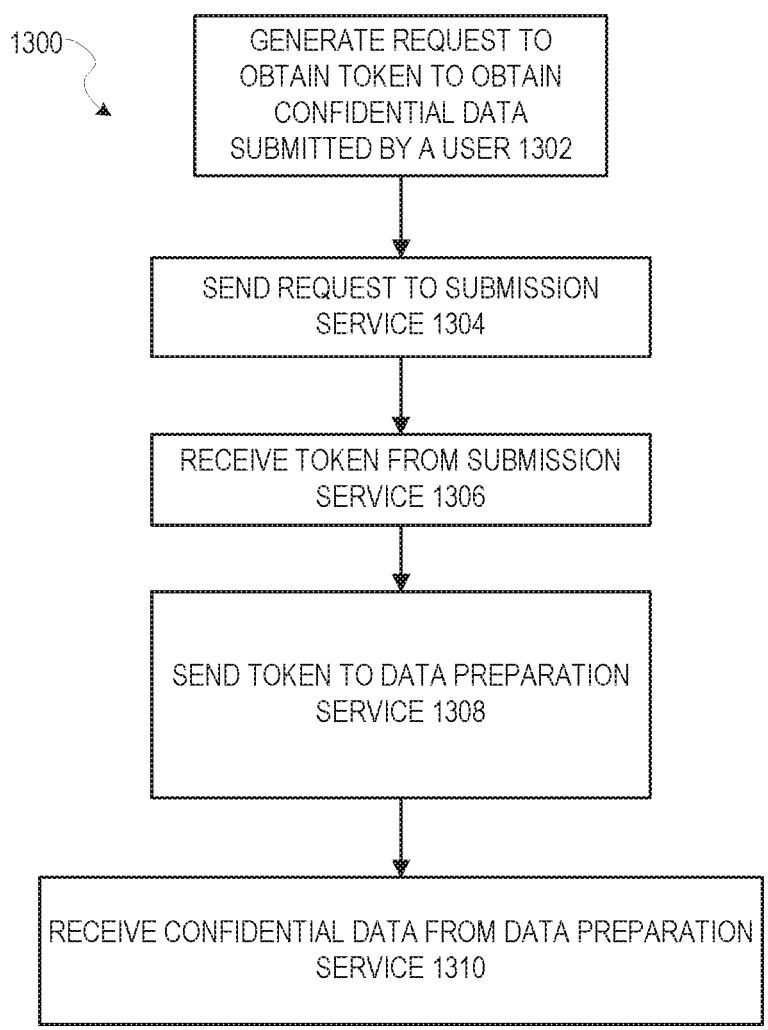
FIG. 13 is a flow diagram illustrating a method of securely accessing confidential data in a database, in accordance with an example embodiment.

FIG. 13 is a flow diagram illustrating a method 1300 of securely accessing confidential data in a database, in accordance with an example embodiment. At operation 1302, a request to obtain a token to obtain confidential data submitted by a user is generated. The confidential data is stored in encrypted format in a first set of columns in a table in a database. At operation 1304, the request to obtain a token is sent to a submission service 504. The submission service 504 has access to a first decryption key for decrypting user identification information stored in encrypted format in a second set of columns in the table in the database. The submission service 504 does not have access to a second decryption key for decrypting the confidential data stored in encrypted format in the first set of columns.

At operation 1306, the token is received from the submission service 504. At operation 1308, the token is sent to a data preparation service 506. The data preparation service 506 has access to the second decryption key. The data preparation service 506 does not have access to the first decryption key. At operation 1310, the confidential data submitted by the user stored in the first set of columns is received from the data preparation service 506, the confidential data having been decrypted by the data preparation service 506.

Figure 14:
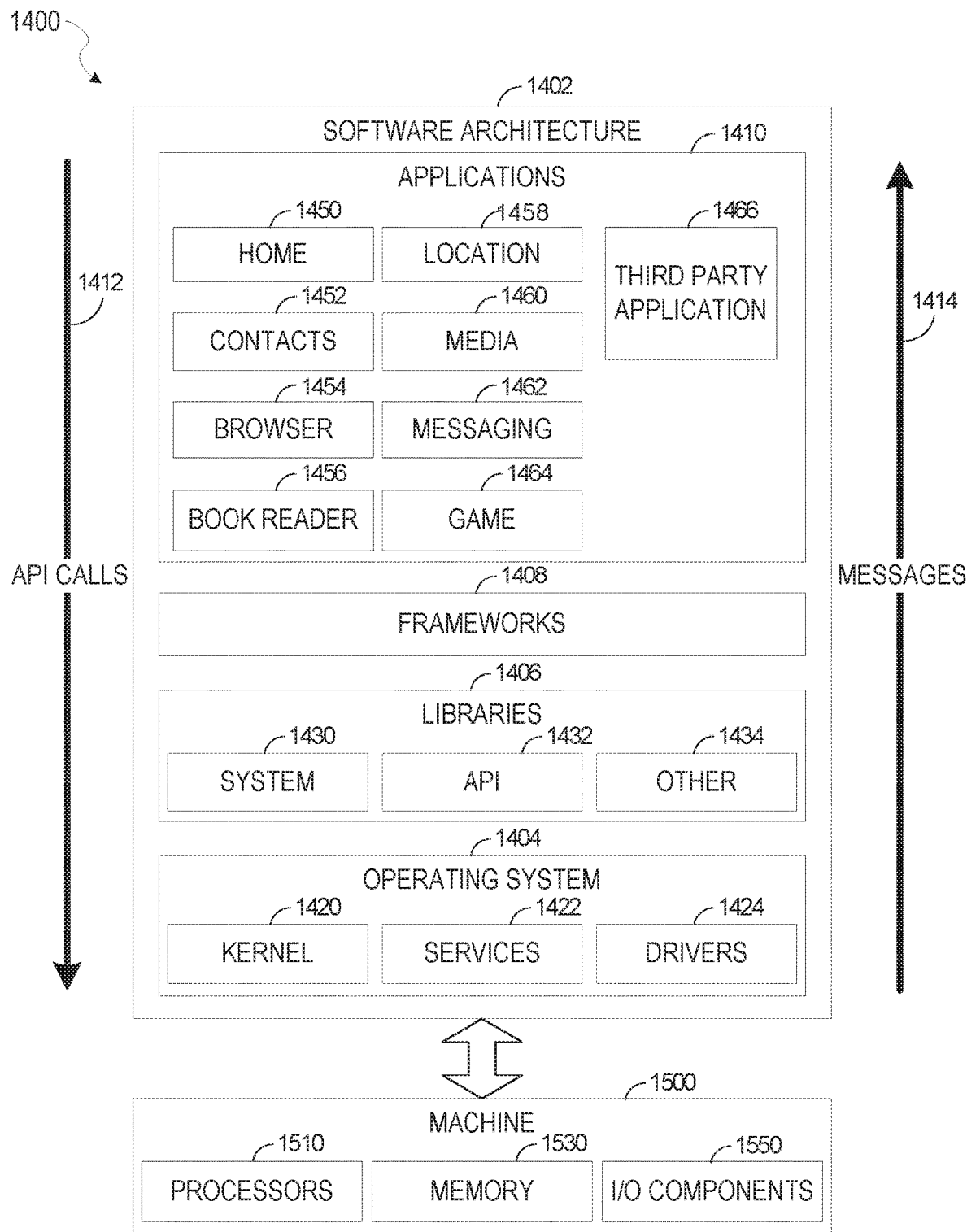
FIG. 14 is a block diagram illustrating a software architecture, which can be installed on any one or more of the devices described above.

FIG. 14 is a block diagram 1400 illustrating a software architecture 1402, which can be installed on any one or more of the devices described above. FIG. 14 is merely a non-limiting example of a software architecture, and it will be appreciated that many other architectures can be implemented to facilitate the functionality described herein. In various embodiments, the software architecture 1402 is implemented by hardware such as a machine 1500 of FIG. 15 that includes processors 1510, memory 1530, and input/output (I/O) components 1550. In this example architecture, the software architecture 1402 can be conceptualized as a stack of layers where each layer may provide a particular functionality. For example, the software architecture 1402 includes layers such as an operating system 1404, libraries 1406, frameworks 1408, and applications 1410. Operationally, the applications 1410 invoke API calls 1412 through the software stack and receive messages 1414 in response to the API calls 1412, consistent with some embodiments.

In various implementations, the operating system 1404 manages hardware resources and provides common services. The operating system 1404 includes, for example, a kernel 1420, services 1422, and drivers 1424. The kernel 1420 acts as an abstraction layer between the hardware and the other software layers, consistent with some embodiments. For example, the kernel 1420 provides memory management, processor management (e.g., scheduling), component management, networking, and security settings, among other functionality. The services 1422 can provide other common services for the other software layers. The drivers 1424 are responsible for controlling or interfacing with the underlying hardware, according to some embodiments. For instance, the drivers 1424 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1406 provide a low-level common infrastructure utilized by the applications 1410. The libraries 1406 can include system libraries 1430 (e.g., C standard library) that can provide functions such as memory allocation functions, string manipulation functions, mathematic functions, and the like. In addition, the libraries 1406 can include API libraries 1432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1406 can also include a wide variety of other libraries 1434 to provide many other APIs to the applications 1410.

The frameworks 1408 provide a high-level common infrastructure that can be utilized by the applications 1410, according to some embodiments. For example, the frameworks 1408 provide various graphical user interface (GUI) functions, high-level resource management, high-level location services, and so forth. The frameworks 1408 can provide a broad spectrum of other APIs that can be utilized by the applications 1410, some of which may be specific to a particular operating system 1404 or platform.

In an example embodiment, the applications 1410 include a home application 1450, a contacts application 1452, a browser application 1454, a book reader application 1456, a location application 1458, a media application 1460, a messaging application 1462, a game application 1464, and a broad assortment of other applications, such as a third-party application 1466. According to some embodiments, the applications 1410 are programs that execute functions defined in the programs. Various programming languages can be employed to create one or more of the applications 1410, structured in a variety of manners, such as object-oriented programming languages (e.g., Objective-C, Java, or C++) or procedural programming languages (e.g., C or assembly language). In a specific example, the third-party application 1466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1466 can invoke the API calls 1412 provided by the operating system 1404 to facilitate functionality described herein.

Figure 15:
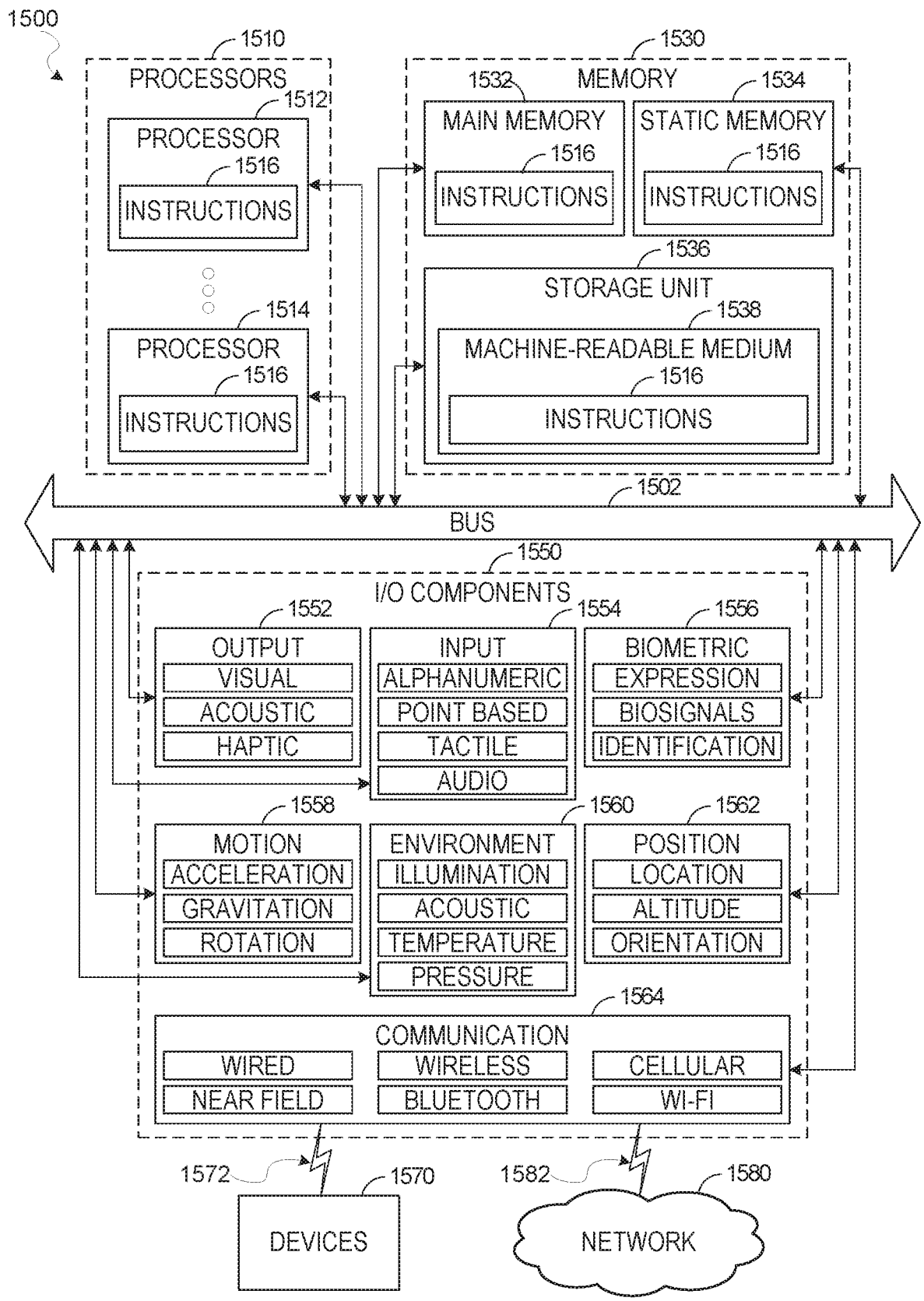
FIG. 15 illustrates a diagrammatic representation of a machine in the form of a computer system within which a set of instructions may be executed for causing the machine to perform any one or more of the methodologies discussed herein, according to an example embodiment.

FIG. 15 illustrates a diagrammatic representation of a machine 1500 in the form of a computer system within which a set of instructions may be executed for causing the machine 1500 to perform any one or more of the methodologies discussed herein, according to an example embodiment. Specifically, FIG. 15 shows a diagrammatic representation of the machine 1500 in the example form of a computer system, within which instructions 1516 (e.g., software, a program, an application 1410, an applet, an app, or other executable code) for causing the machine 1500 to perform any one or more of the methodologies discussed herein may be executed. For example, the instructions 1516 may cause the machine 1500 to execute the method 1300 of FIG. 13. Additionally, or alternatively, the instructions 1516 may implement FIGS. 1-13, and so forth. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an example embodiment, the processors 1510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536, all accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine 1500 will depend on the type of machine 1500. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion, and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications 1010, measurements, or signals corresponding to a surrounding physical environment. The position components 1562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1530, 1532, 1534, and/or memory of the processor(s) 1510) and/or the storage unit 1536 may store one or more sets of instructions 1516 and data structures (e.g., software) embodying or utilized by any one or more of the methodologies or functions described herein. These instructions (e.g., the instructions 1516), when executed by the processor(s) 1510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1516 and/or data. The terms shall accordingly be taken to include, but not be limited to, solid-state memories, and optical and magnetic media, including memory internal or external to the processors 1510. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1516 may be transmitted or received over the network 1580 using a transmission medium via a network interface device (e.g., a network interface component included in the communication components 1564) and utilizing any one of a number of well-known transfer protocols (e.g., HTTP). Similarly, the instructions 1516 may be transmitted or received using a transmission medium via the coupling 1572 (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1516 for execution by the machine 1500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:
1. A computerized method comprising:
   generating a request to obtain a token to obtain confidential data submitted by a user, the confidential data stored in encrypted format in a first set of columns in a table in a database;

sending the request to obtain a token to a submission service, the submission service having access to a first decryption key for decrypting user identification information stored in encrypted format in a second set of columns in the table in the database, the submission service not having access to a second decryption key for decrypting the confidential data stored in encrypted format in the first set of columns;

receiving, from the submission service, the token;

sending the token to a data preparation service, the data preparation service having access to the second decryption key, the data preparation service not having access to the first decryption key; and receiving, from the data preparation service, the confidential data submitted by the user stored in the first set of columns, the confidential data having been decrypted by the data preparation service.

2. The computerized method of claim 1, wherein the token is cipher text generated by encrypting a combination of the user identification information from the second set of columns in the table and a submission identification corresponding to the user's submission of confidential data.

3. The computerized method of claim 2, wherein the user identification information from the second set of columns in the table used to generate the cipher text was decrypted by the submission service using the first decryption key.

4. The computerized method of claim 3, further comprising:

validating, at the submission service, that an invocation context captured for the user contains a user identification that matches the user identification information encrypted by the submission service; and permitting access to the confidential data in the first set of columns to the user only once the validating is complete.

5. The computerized method of claim 3, further comprising:

validating, at the data preparation service, that user identification information encrypted in the token matches a user identification of a user requesting the confidential data; and permitting access to the confidential data in the first set of columns to the user only once the validating is complete.

6. The computerized method of claim 3, wherein the computerized method is performed by a personalization service.

7. The computerized method of claim 6, wherein the personalization service presents, in a graphical user interface viewable only by the user, an indication of a job listing and an graphical indication of how much more a job associated with the job listing pays than a compensation amount contained in the confidential data for the user.

8. A system comprising:

a computer-readable medium having instructions stored there on, which, when executed by a processor, cause the system to execute operations comprising:

generating a request to obtain a token to obtain confidential data submitted by a user, the confidential data stored in encrypted format in a first set of columns in a table in a database;

sending the request to obtain a token to a submission service, the submission service having access to a first decryption key for decrypting user identification information stored in encrypted format in a second set of columns in the table in the database, the submission service not having access to a second decryption key for decrypting the confidential data stored in encrypted format in the first set of columns;

receiving, from the submission service, the token;

sending the token to a data preparation service, the data preparation service having access to the second decryption key, the data preparation service not having access to the first decryption key; and receiving, from the data preparation service, the confidential data submitted by the user stored in the first set of columns, the confidential data having been decrypted by the data preparation service.

9. The system of claim 8, wherein the token is cipher text generated by encrypting a combination of the user identification information from the second set of columns in the table and a submission identification corresponding to the user's submission of confidential data.

10. The system of claim 9, wherein the user identification information from the second set of columns in the table used to generated the cipher text was decrypted by the submission service using the first decryption key.

11. The system of claim 10, wherein the operations further comprise:

validating, at the submission service, that an invocation context captured for the user contains a user identification that matches the user identification information encrypted by the submission service; and permitting access to the confidential data in the first set of columns to the user only once the validating is complete.

12. The system of claim 10, wherein the operations further comprise:

validating, at the data preparation service, that user identification information encrypted in the token matches a user identification of a user requesting the confidential data; and permitting access to the confidential data in the first set of columns to the user only once the validating is complete.

13. The system of claim 1, wherein the operations are performed by a personalization service.

14. The system of claim 13, wherein the personalization service presents, in a graphical user interface viewable only by the user, an indication of a job listing and an graphical indication of how much more a job associated with the job listing pays than a compensation amount contained in the confidential data for the user.

15. A non-transitory machine-readable storage medium comprising instructions, which when implemented by one or more machines, cause the one or more machines to perform operations comprising:

generating a request to obtain a token to obtain confidential data submitted by a user, the confidential data stored in encrypted format in a first set of columns in a table in a database;

sending the request to obtain a token to a submission service, the submission service having access to a first decryption key for decrypting user identification information stored in encrypted format in a second set of columns in the table in the database, the submission service not having access to a second decryption key for decrypting the confidential data stored in encrypted format in the first set of columns;

receiving, from the submission service, the token;

sending the token to a data preparation service, the data preparation service having access to the second decryption key, the data preparation service not having access to the first decryption key; and receiving, from the data preparation service, the confidential data submitted by the user stored in the first set of columns, the confidential data having been decrypted by the data preparation service.

16. The non-transitory machine-readable storage medium of claim 15, wherein the token is cipher text generated by encrypting a combination of the user identification information from the second set of columns in the table and a submission identification corresponding to the user's submission of confidential data.

17. The non-transitory machine-readable storage medium of claim 16, wherein the user identification information from the second set of columns in the table used to generate the cipher text was decrypted by the submission service using the first decryption key.

18. The non-transitory machine-readable storage medium of claim 17, wherein the operations further comprise:
validating, at the submission service, that an invocation context captured for the user contains a user identification that matches the user identification information encrypted by the submission service; and
permitting access to the confidential data in the first set of columns to the user only once the validating is complete.

19. The non-transitory machine-readable storage medium of claim 17, wherein the operations further comprise:
validating, at the data preparation service, that user identification information encrypted in the token matches a user identification of a user requesting the confidential data; and
permitting access to the confidential data in the first set of columns to the user only once the validating is complete.

20. The non-transitory machine-readable storage medium of claim 15, wherein the operations are performed by a personalization service.

* * * * *